3,131,119
OIL-DISPERSIBLE DITHIOCARBAMATES
David B. Fordyce, Moorestown, N.J., and Gerard C. Riley, Churchville, Pa., assignors to Rohm & Haas Company, Philadelphia, Pa., a corporation of Delaware
No Drawing. Filed Apr. 6, 1960, Ser. No. 20,243
9 Claims. (Cl. 167—22)

This invention concerns oil-dispersible, water-insoluble salts of dithiocarbamic acids, such as ethylenebisdithiocarbamic acid and dimethyldithiocarbamic acid, especially the zinc, iron, nickel, copper, and manganese salts. It also concerns compositions which comprise one or more of such oil-dispersible salts dispersed in oil, especially an agricultural spray oil. These compositions represent one form in which these salts are applied to plants for protection against fungus diseases. Again, these compositions may be extended with water before application, in which case there is also present an emulsifying agent.

It has been proposed to add conventional dispersing agents to insoluble metal salts of dithiocarbamic acids, such as sodium lignin sulfonates and condensed naphthalene-formaldehyde sulfonates. While these may prevent agglomeration in aqueous systems, it has recently been observed that they tend to decrease the biological activity of some of these salts. Such dispersing agents, furthermore, do not aid in providing useful suspensions of the salts in oils. In fact, in the presence of such conventional dispersing agent on particles of insoluble metal dithiocarbamates, flocculation or agglomeration can occur in oil systems.

According to the present invention water-insoluble metal salts of dithiocarbamic acids such as ethylenebisdithiocarbamic acid or dimethyldithiocarbamic acid can be rendered dispersible in oil systems by treating such salts with an organic solvent-soluble polymer which possesses a balance of hydrophilic and lipophilic groups.

Lipophilic or hydrophobic groups are supplied by hydrocarbon groups containing at least eight carbon atoms, preferably at least 12 or more carbon atoms, and having up to 24 carbon atoms. Hydrophilic groups are supplied by multiple ether groups, including thioether, carbonyl groups, carboxylic acid groups, carboxylic ester groups, carrying alcohol residues of not over about six carbon atoms, amide groups, and amino groups. The amino and amide groups may be primary, secondary, or tertiary, open-chained or cyclic, thus carrying two hydrogens, one hydrogen or no hydrogen on the nitrogen. The remaining valences may be satisfied with alkyl, cycloalkyl, phenyl, benzyl, aminoalkyl, phenoxyalkyl, hydroxyalkyl, alkoxyalkyl, alkoxyethoxyethyl, alkoxypropoxypropyl, alkoxypolyethoxyethyl, benzoxyethoxyethyl, phenoxypolyethoxyethyl, or similar polyether-containing groups.

The proportion of lipophilic groups must be sufficient to ensure solubility of the polymer in a light petroleum oil. There must also exist in the polymer a sufficient degree of polarity to ensure adsorption of polymer on the metal dithiocarbamate. The necessary minimum proportion of hydrophilic groups will depend primarily upon the nature of these groups.

The hydrophobic portion of the useful polymers is supplied by such comonomers as octyl, decyl, lauryl, myristyl, cetyl, stearyl, eicosyl, or tetracosyl groups in esters of acrylic, methacrylic, fumaric, maleic, or itaconic acids, or in vinyl carboxylates with alkyl groups of at least eight carbon atoms. Polymers or copolymers from these long-chained esters by themselves do not, however, possess the necessary hydrophobic-hydrophilic or polar balance. There must also be present either in the polymerizing molecule or in the copolymer at least one additional source of polar or hydrophilic grouping, such grouping being of sufficient polarity or present in sufficient proportion to create the needed polar balance.

Examples of monomers providing homopolymers with an effective polar balance include N-tert-dodecylaminoethyl methacrylate and N-tert-alkylaminoethyl methacrylate with the tert-alkyl group being a mixture of $C_{18}$ to $C_{21}$, or $C_{12}$ to $C_{14}$, or $C_9$ to $C_{10}$ groups.

These same kinds of starting materials may also be used in forming copolymers along with other comonomers whether these are hydrophobic or hydrophilic in nature. Typical comonomers useful for supplying the hydrophilic balance include lower alkyl acrylates, methacrylates, itaconates, fumarates, or maleates and comparable polymerizable ethylenically unsaturated monomers in which the alkyl portion does not exceed $C_6$ and is preferably $C_1$ to $C_4$. Alkyloxypolyethoxyethyl acrylates and methacrylates also supply polar groups. The alkyloxy group in such ether esters may be replaced with alkylamino, alkylthio, or acyloxy-groups. Vinyl acetate, propionate, and butyrate may be mentioned as similar sources of polar ester groups for forming copolymers.

Amine and amide groups may also be used to supply polarity. Typical comonomers for this purpose include dimethylaminoethyl or dimethylaminopropyl acrylates or methacrylates, acrylamide, methacrylamide, vinylpyridines, such as 2-methyl-5-vinylpyridine, or 4- or 2-vinylpyridine, N-methylolacrylamide, N-methylolmethacrylamide, or N-methylacrylamide.

Comparable polar groups can be supplied by lactams which carry a vinylidene group, examples of which are N-vinyl-2-pyrrolidinone, N-vinylpiperidinone, N-vinylcaprolactam, and 2-pyrrolidinonylethyl methacrylate. There may also be used oxazolidine derivatives such as N-vinyloxazolidinone or N-(methacryloyloxyethyl)oxazolidinone.

The effective homopolymers and copolymers can be defined as those which are soluble in hydrocarbon oils and which contain both hydrophobic and hydrophilic substituents in a polar-non-polar balance. Such a balance can be expressed in terms of the solubility parameter $\delta$ which was proposed by Hildebrand in "Solubility of Nonelectrolytes." This value, which equals the square root of the cohesive energy density, has been determined for a wide variety of solvents and also for various polymers. See, for example, "Interchemical Review," vol. 14, No. 1, 3–16 (1955). Typical values are given in Table I. Where values for polymers have been previously given, these are here used. For other polymers, values have been estimated on the basis of such known values and changes in structure or on the basis of other data.

TABLE I

Typical Solubility Parameters of Polymers

| Polymer of | $\delta$ |
|---|---|
| Methyl methacrylate | 9.5 |
| Vinyl acetate | 9.4 |
| Styrene | 9.1 |
| Butyl methacrylate | 9.0 |
| Hexyl methacrylate | 8.7 |
| Octyl methacrylate | 8.5 |
| Tert-dodecylaminoethyl methacrylate | 8.2 |
| Vinyl 2-ethylhexoate | 8.1 |
| Lauryl-myristyl (72:28) methacrylate | 8.0 |
| Vinyl stearate | 7.6 |
| Stearyl methacrylate | 7.0 |
| Dilauryl fumarate | 6.8 |
| Dicetyl itaconate | 6.5 |
| N-vinyl-2-pyrrolidinone | 12 |
| Dimethylaminoethyl methacrylate | 10 |
| 2-methyl-5-vinyl pyridine | 10 |

Solubility parameters can be approximated by calculations according to the method of Small, J. Appl. Chem. 3, 71 (1953). They may be determined experimentally from solubilities of polymers in a series of solvents of known δ values, the midpoint of a series of solvents being sufficiently exact to give a usable δ value, the solvents being arranged in order of δ values.

The solubility parameters for copolymers can be calculated on the basis of the δ values for the units for each type of comonomer, these being combined on a weight average basis. Values for typical copolymers are given in Table II.

TABLE II

*Solubility Parameters of Copolymers*

Copolymer compositions:  δ
- 65% LMMA/35% CSMA _____ 7.7
- 80% diLMF/20% NVP _____ 7.8
- 50% BMA/50% CSMA _____ 8.0
- 14% MMA/51% LMMA/30% CSMA/5% NVP _____ 8.0
- 25% BMA/15% HMA/30% LMMA/30% CSMA _____ 8.1
- 33.5% BMA/35% LMMA/30% CSMA/1.5% diMAEMA _____ 8.1
- 31.6% ViSt/63.2% ViEH/5.2% NVP _____ 8.1
- 17% BMA/45.2% LMMA/30% CSMA/7.8% NVP _____ 8.2
- 32% BMA/25% LMA/35% CSMA/8% NVP_ 8.3

Notes:
MA=methacrylate
F=fumarate
NVP=N-vinyl-2-pyrrolidinone
M=methyl
B=butyl
LM=lauryl-myristyl
CS=cetyl-stearyl
EH=2-ethylhexoate
Vi=vinyl
St=stearate
DiMAEMA=dimethylaminoethyl methacrylate When the solubility parameter of homopolymer or copolymer has a value of 7.7 to 8.3, the homopolymer or copolymer has a proper balance to disperse a metallic dithiocarbamate in an agricultural oil.

The insoluble metal salts which are rendered dispersible in oils include the zinc, iron, nickel, copper, and manganese salts of ethylenebisdithiocarbamic acid or of dimethyldithiocarbamic acid, or mixtures thereof. The insoluble metal dithiocarbamates are prepared commercially in an average particle size of less than about three microns and this size is preferably between 0.1 to 2 microns.

Polymer is conveniently applied to the dry metal dithiocarbamate from a concentrated or dilute solution of polymer in an oil, such as a mineral oil, or in a volatile organic solvent, such as benzene, toluene, xylene, aromatic naphtha, chlorinated hydrocarbon, chloroform, ester solvents, such as ethyl acetate or butyl acetate, and mixtures of organic solvents. If desired, a volatile solvent may be driven off as by heating the treated metal dithiocarbamate at normal or reduced pressure. When a less volatile or nonvolatile solvent for the polymer is present, it may be left in the mixture in whole or in part.

The amount of polymer may be varied from about 0.5% to 15% of the weight of the metal dithiocarbamate. With a relatively finer particle sizes of the metal dithiocarbamate being treated for a given state of minimum suspendibility the ratio of polymer to solid should be greater than when relatively coarser particles are used. The preferred amounts of polymer are from about 1% to 5% by weight based on the metal dithiocarbamate. The optimum proportion of polymer may also depend upon the amount of dithiocarbamate suspended in a given quantity of oil, larger amounts being apparently better suspended with increasing proportions of polymer.

There are some minor differences in the effectiveness of a given polymer for rendering different metal salts equally suspendible in oils. In general, zinc, nickel, iron, copper, and manganese ethylenebisdithiocarbamates appear more readily dispersible than iron dimethyldithiocarbamate, which in turn is more readily dispersed than the corresponding zinc salt. This zinc salt seems to require for best results a somewhat greater degree of polarity in the polymer than is needed with other metal dithiocarbamates. Increase in polarity may often be more desirable than increase in proportion used with the more difficultly dispersible metal salts. It might also be commented that there may be variation in dispersibility of different lots of a given metal salt, but choice of polymer and minor adjustment of proportion can readily compensate for this.

Typical preparations are described in the following illustrative examples. Parts are by weight unless otherwise designated.

EXAMPLE 1

(a) A commercial preparation of manganese ethylenebisdithiocarbamate, maneb, is taken, which has a content of 80% of this compound and has an average particle size of 1 to 2 microns. It is placed in a blender and there is sprayed onto the agitated powder a 25% solution in kerosene of a copolymer from 30% of stearyl methacrylate, 45% of lauryl methacrylate, 17% of butyl methacrylate, and 8% of N-vinyl-2-pyrrolidinone. The molecular weight of this copolymer is about 350,000. Enough copolymer is sprayed onto and mixed with the powdered metal salt to supply 2.5% of copolymer based on the weight of the salt.

A sample of 3.6 parts of the thus treated salt is added to 100 parts by volume of a prepared orchard spray oil and shaken therewith. A portion of this suspension is left in a glass cylinder and observed from time to time. It remains well suspended for over three weeks. In contrast, a mixture of oil with 3.6% of the original untreated maneb flocs within two hours.

(b) The above procedure is repeated with use of 1%, 2%, 5%, 10%, and 12% of the copolymer based on the weight of the maneb. In every case the polymer-treated maneb remains well suspended in the oil for over three weeks. Here the weight of maneb suspended is held at 3.6 parts by weight in 100 parts by volume of spray oil.

(c) Maneb is treated with the solution of the above copolymer in the same way, the copolymer supplied being 2% of the weight of the maneb. A 5% suspension of this treated maneb is prepared in the spray oil. It remains well suspended for over three weeks. In contrast a 5% suspension of the original maneb in oil flocs within a half hour.

An oil suspension of this treated maneb is made to contain 7.5% of maneb. It remains suspended for over three weeks, whereas a 7.5% suspension of the original maneb in oil flocs in less than 30 minutes.

(d) The above polymer is applied in the same way to nickel ethylenebisdithiocarbamate. The treated powder exhibits good suspendibility in spray oils, whereas the untreated powder flocs in oil.

(e) The above polymer is applied in the same way to copper ethylenebisdithiocarbamate, which is thereby rendered suspendible in oils.

EXAMPLE 2

(a) The copolymer described in Example 1 is applied to zineb, zinc ethylenebisdithiocarbamate, by slowly adding the kerosene solution of the copolymer to a well agitated batch of the dry zineb. This lot of zineb has an average particle size of about 1.5 to 3 microns. Solution is added until there is present 2.5% of copolymer based on the weight of the zineb. The resulting composition remains as powder and can be stored for considerable periods of time with retention of its activity and suspendibility.

A mixture of four parts of this composition and 100 parts of spray oil provides a composition in which the zineb remains suspended for many days. This composition can be sprayed on plants when oil sprays are permissible to protect against fungus diseases. One plant which is desirably thus treated is the banana to protect against sigatoka.

When conventional zineb is mixed with the spray oil, the resulting suspension flocs in a short time; less than a half hour.

(b) There are similarly prepared compositions of zineb and the same polymer at 5%, 7.5%, and 10% of the weight of the zineb. All of these preparations are readily taken up in spray oils to give excellent suspensions.

EXAMPLE 3

(a) The copolymer of Examples 1 and 2 is sprayed onto finely powdered ferbam, iron dimethyldithiocarbamate, in a ribbon blender until 2.5% of copolymer has been supplied. The resulting composition is a powder which can be stored and shipped. It can be mixed with a petroleum oil suitable for application to plants and it is well suspended therein. In contrast a sample of the untreated ferbam rapidly flocs after being mixed with oil.

(b) The copolymer of Examples 1 and 2 is applied in the same way in proportions of 1%, 5%, 10%, and 15% to finely particled ferbam.

When these treated ferbam preparations are mixed with spray oils, they are well dispersed and remain suspended for considerable periods of time. As the proportion of ferbam to oil is increased it is desirable to increase the amount of copolymer deposited on the metal dithiocarbamates, if prolonged periods of good suspension are desired.

(c) The copolymer of Examples 1 and 2 is applied as above and in the same proportions to finely particled ziram, zinc dimethyldithiocarbamate. The resulting composition is a stable product which can be stored and shipped. It can readily be mixed with spray oils and gives suspensions which exhibit good application properties for protecting plants against disease in those cases where oils can be used.

(d) The copolymer used above is similarly applied to a mixed zinc and manganese dimethyldithiocarbamate. At each proportion marked improvement in suspendibility in oil is obtained. Without the copolymer, the mixed salts floc in oil after short periods of time, usually less than one-half hour.

(e) The copolymer used above is similarly applied to copper dimethyldithiocarbamate. There is likewise obtained marked improvement in suspendibility in oils.

(f) The procedure is repeated with nickel dimethyldithiocarbamate. Again, marked improvement in suspendibility is obtained.

EXAMPLE 4

In the same way there is applied to the same lots of dithiocarbamates used in Example 3 a toluene solution of 20% of copolymer (viscosity average molecular weight of 800,000) from 25 parts of butyl methacrylate, 15 parts of hexyl methacrylate, 30 parts of lauryl methacrylate, and 30 parts of stearyl methacrylate in amounts of 2.5%, 5%, 7.5% and 15% based on the weight of the dithiocarbamate.

In the case of ferbam, mixed zinc-manganese salt, copper salt, and nickel salt at all concentrations good suspendibility in oil is observed.

EXAMPLE 5

In the same way there is applied to the metal dithiocarbamate used in Examples 1 to 4 a 20% solution in toluene of a copolymer prepared by free radical polymerization of a mixture of 12 parts of butyl methacrylate, 50 parts of lauryl methacrylate, and 30 parts of stearyl methacrylate with which is polymerized 8 parts of N-vinyl-2-pyrollidinone. This copolymer has a viscosity average molecular weight of 550,000. The amounts of this copolymer are varied from 1% to 10% based on the weight of the dithiocarbamate.

Portions of 2.5, 5.0, and 10.0 grams of each are shaken with 100 ml. portions of commercial spray oils. In every case the use of copolymer provides marked improvement in suspendibility. With the higher proportions of dithiocarbamate to oil it is preferred that the amount of copolymer applied to the dithiocarbamate be increased above the minimum requirement if optimum suspendibility is desired.

EXAMPLE 6

The procedures described in Example 5 are carried out with a solution in light petroleum oil (SUS 100) of 25% of copolymer (molecular weight about 1,000,000) from 30% stearyl methacrylate, 40% lauryl-myristyl methacrylate, 10% butyl methacrylate, 10% methyl methacrylate, and 5% 4-vinylpyridine. In every case there is observed good suspendibility of the metal dithiocarbamate in spray oils. ($\delta$ for copolymer is about 8.1.)

EXAMPLE 7

(a) There is mixed with a maneb having an active content of 70% of maganese ethylenebisdithiocarbamate a solution in light petroleum oil of 28% of copolymer (molecular weight 900,000) from 33 parts of stearyl methacrylate, 17 parts of cetyl methacrylate, and 50 parts of n-butyl methacrylate in amounts to supply 2.5%, 7.5% and 10% of copolymer on the weight of the maneb. These preparations are examined in commercial spray oils. In every case suspensions are obtained which are stable over long periods of time, suspensions with 3, 5, and 10 parts by weight of treated metal dithiocarbamate being mixed with 100 parts by volume of spray oil. The untreated maneb, when shaken with the same oils, flocs within a half hour.

(b) The procedure of (a) is followed substituting a zineb with a zinc ethylenebisdithiocarbamate content of 65%. Improvements in suspendibility in oil are observed comparable to those described above.

EXAMPLE 8

In the same way a 20% solution in light petroleum oil of a copolymer from 32 parts of vinyl stearate, 63 parts of vinyl-2-ethylhexanoate, and 5 parts of N-vinylpyrrolidinone (viscosity average molecular weight about 1,000,000) is applied in separate mixing operations to maneb, zineb, ziram, and ferbam to provide 2%, 5%, and 10% of copolymer on the weight of the metal dithiocarbamate. In every case the resulting composition is readily dispersible in spray oils and remains well suspended.

EXAMPLE 9

A polymer of N-tert-dodecylaminoethyl methacrylate (molecular weight about 200,000) is taken up in a mixture of dioxane and ethylene dichloride (30% solution of polymer) and is mixed with maneb, to supply 2.6% of polymer based on the weight of maneb. The resulting composition is readily dispersed in spray oils at levels of 2%, 5%, and 7.5% and remains well suspended therein.

EXAMPLE 10

In the same way there is applied to maneb of particle size less than 2 microns 2.5% of a copolymer based on 33.5% of n-butyl methacrylate, 35% of a commercial lauryl methacrylate, 30% of stearyl methacrylate, and 1.5% of dimethylaminoethyl methacrylate, in a 30% solution in toluene. The molecular weight of this copolymer is over 1,000,000. The resulting product exhibits excellent suspendibility in oils.

The polymers used above all have the required polar balance, contain both hydrophobic and hydrophilic portions, and have a solubility parameter in the range of 7.7 to 8.3. The molecular weight of the polymers appears relatively unimportant, polymers meeting the above requirements with molecular weights from about 100,000 to about 2,000,000 having been found effective.

EXAMPLE 11

A copolymer of a viscosity average molecular weight of about 1,100,000 from 35% butyl methacrylate, 25% lauryl-myristyl methacrylate, 32% cetyl-stearyl methacrylate, and 8% of N-vinyl-2-pyrrolidinone in a 30% solution in light mineral oil is applied to maneb and zineb in separate batches over a range of 2.5%, 5%, and 7.5% of copolymer based on the weight of the metallic ethylenebisdithiocarbamate. The resulting compositions are mixed with spray oils at 3 and 6 parts by weight for 100 parts by volume of oil. Excellent suspensions are obtained in each case.

EXAMPLE 12

A copolymer of a viscosity average molecular weight of about 100,000 and $\delta$ of about 7.8 from 55% dodecyl fumarate, 25% tetradecyl fumarate, and 20% N-vinyl-2-pyrrolidinone in a 28% solution in toluene is applied to maneb and ferbam in separate batches at 2.5%, 7.5%, and 10% of copolymer based on the weight of the dithiocarbamate. The resulting compositions are mixed with spray oils at 3 and 6 parts by weight per 100 volumes of oil. In each case, excellent suspensions are obtained.

EXAMPLE 13

A copolymer of a viscosity average molecular weight of 1,650,000 from 25 parts of butyl methacrylate, 15 parts of hexyl methacrylate, 30 parts of lauryl-myristyl methacrylate, and 30 parts of cetyl-stearyl methacrylate in a 20% solution in light oil is applied to maneb, zineb, and cupric ethylenebisdithiocarbamate at concentrations of copolymer of 2.5% and 5%. The solubility parameter $\delta$ estimated for this copolymer is between 8.1 and 8.2. These compositions are mixed with typical spray oils at 3 to 10 parts by weight per 100 parts by volume of oil. In every case long-lasting suspensions are obtained.

As has been demonstrated, useful compositions may be prepared by absorbing on particles of oil-insoluble metal dithiocarbamates an oil-soluble polymer which contains both hydrophilic and lipophilic portions in a non-polar-polar balance and which has a solubility parameter $\delta$ of 7.7 to 8.3. The polymer may be used in an amount from about 0.5% to about 15% of the weight of the metal dithiocarbamate.

From these treated dithiocarbamates other compositions may be prepared by mixing the treated dithiocarbamate with oil. Spray compositions are prepared by mixing one or more polymer-bearing metal dithiocarbamates with an oil or an oil containing one or more surface-active agents. The polymer-bearing dithiocarbamate may compose from 1% to 15% of such a mixture which is sprayable. On the other hand, sufficient thus treated dithiocarbamate may be mixed with oil or oil and surface-active agent, which may include emulsifier to form a paste. Such paste may be later mixed with additional oil to form a sprayable composition. Since such pastes may not be as stable on prolonged storage as polymer-treated powder, the latter are preferred for most situations.

Finally mixtures of treated dithiocarbamate and oil may be extended with water when an emulsifier is added or is present in the mixture to provide sprayable compositions extended with water.

Oils which may be used with the treated metal dithiocarbamates include conventional spray oils. These have a relatively high unsulfonatable residue, 90% or more usually, and range in viscosity from about 50 to 250 SUS at 100° F. The boiling ranges vary somewhat but are usually between 550 and 800° F. As a typical spray oil there may be mentioned one having a viscosity of 70–75 SUS at 100° F. and a boiling range from 615° F. to an end point of 710° F. and another having a viscosity of 100–120 SUS at 100° F. and a boiling range starting at about 630° F. with an end point at 760° F.

The spray oil may carry 1% to 5% of oil-soluble emulsifier, if desired. Typical emulsifiers are octyl- or nonyl-phenoxy-polyethoxyethanols or calcium dodecylbenzene sulfonate, or mixtures of non-ionic or of anionic emulsifiers or of the two types of surface active agents. Oil-soluble metal carboxylates or soaps may be used and also petroleum sulfonates.

Oil sprays are commonly applied as dormant sprays for scale on apples and pears and for Coryneum blight on stone fruit, also for mite eggs. Another well known application of oils is on citrus trees to combat scale and rust mites. These sprays may be improved by use therein of certain metal dithiocarbamates. A potential use of metal dithiocarbamates suspended in oils which are emulsified is for aerial applications. The oil helps prevent drying out of the spray before deposition.

We claim:

1. A composition comprising a finely particled oil-insoluble, water-insoluble metal dithiocarbamate, said dithiocarbamate selected from the class consisting of dimethyldithiocarbamate and ethylenebisdithiocarbamate and mixtures thereof in combination with 0.5% to 15% of the weight of said metal dithiocarbamate of an oil-soluble addition polymer derived from at least one monoethylenically unsaturated polymerizable ester and having both lipophilic and hydrophilic portions in a non-polar-polar balance and having a solubility parameter of 7.7 to 8.3 and a molecular weight of about 100,000 to about 2,000,000.

2. A composition comprising a metal dithiocarbamate from the class consisting of zinc, iron, nickel, copper, and manganese salts of dimethyldithiocarbamic and ethylenebisdithiocarbamic acids and mixtures thereof in finely particled form in combination with an oil-soluble addition polymer derived from at least one monoethylenically unsaturated polymerizable ester and having both lipophilic and hydrophilic portions in a non-polar-polar balance and having a solubility parameter of 7.7 to 8.3, the polymer in combination with said dithiocarbamate being 0.5% to 15% of the weight of said dithiocarbamate, and having a molecular weight of about 100,000 to about 2,000,000.

3. A composition comprising zinc ethylenebisdithiocarbamate in finely particled form in combination with 0.1 to 15% of the weight of said zinc ethylenebisdithiocarbamate of an oil-soluble addition polymer derived from at least one monoethylenically unsaturated polymerizable ester and having both lipophilic and hydrophilic portions in a non-polar-polar balance and having a solubility parameter of 7.7 to 8.3 and a molecular weight of about 100,000 to about 2,000,000.

4. A composition comprising manganese ethylenebisdithiocarbamate in finely particled form in combination with 0.1 to 15% of the weight of said manganese ethylenebisdithiocarbamate of an oil-soluble addition polymer derived from at least one monoethylenically unsaturated polymerizable ester and having both lipophilic and hydrophilic portions in a non-polar-polar balance and having a solubility parameter of 7.7 to 8.3 and a molecular weight of about 100,000 to about 2,000,000.

5. A composition comprising a mixture of agricultural spray oil having a viscosity at 100° F. between about 50 and about 250 S.U.S and a metal dithiocarbamate from the class consisting of zinc, iron, nickel, copper, and manganese salts of dimethyldithiocarbamic and ethylenebisdithiocarbamic acids and mixtures thereof in finely particled form in combination with an oil-soluble addition polymer derived from at least one monoethylenically unsaturated polymerizable ester and having both lipophilic and hydrophilic portions in a non-polar-polar balance and having a solubility parameter of 7.7 to 8.3, the polymer in combination with said dithiocarbamate being 0.5% to 15% of the weight of said dithiocarbamate and having a molecular weight of about 100,000 to 2,000,000.

6. A composition according to claim 5 in which the metal dithiocarbamate is about 1% to 15% of the oil.

7. A composition according to claim 6 in which the metal dithiocarbamate is zinc ethylenebisdithiocarbamate.

8. A composition according to claim 6 in which the metal dithiocarbamate is manganese ethylenebisdithiocarbamate.

9. A composition according to claim 6 in which the metal dithiocarbamate is iron dimethyldithiocarbamate.

References Cited in the file of this patent

UNITED STATES PATENTS

| | | |
|---|---|---|
| 2,797,181 | Drexel | June 25, 1957 |
| 2,870,058 | Loder | Jan. 20, 1959 |
| 2,910,402 | Fairchild | Oct. 27, 1959 |
| 2,957,854 | Lorensen et al. | Oct. 25, 1960 |
| 2,992,161 | Flenner | July 11, 1961 |
| 3,030,303 | Ryan | Apr. 17, 1962 |
| 3,033,828 | Nelson | May 8, 1962 |

FOREIGN PATENTS

| | | |
|---|---|---|
| 604,374 | Canada | Aug. 30, 1960 |

OTHER REFERENCES

McCutcheon: Soap and Chemical Specialties, pp. 62 and 66, part III, Surfactants Listed February 1958.

Br. Patent 802,111, published October 1, 1958.